March 24, 1953  D. FRIEBERG  2,632,490
EGG SEPARATOR
Filed Sept. 12, 1951  3 Sheets-Sheet 1
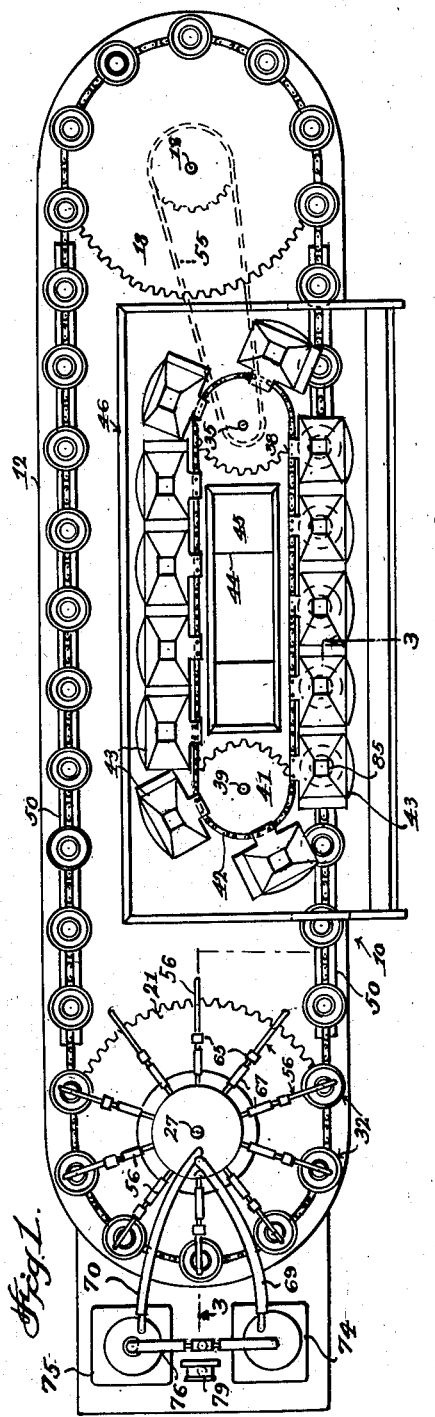
Inventor
DAVIS FRIEBERG
By John N. Randolph
Attorney March 24, 1953　　　　　　D. FRIEBERG　　　　　　2,632,490
EGG SEPARATOR
Filed Sept. 12, 1951　　　　　　　　　　　　　3 Sheets-Sheet 2
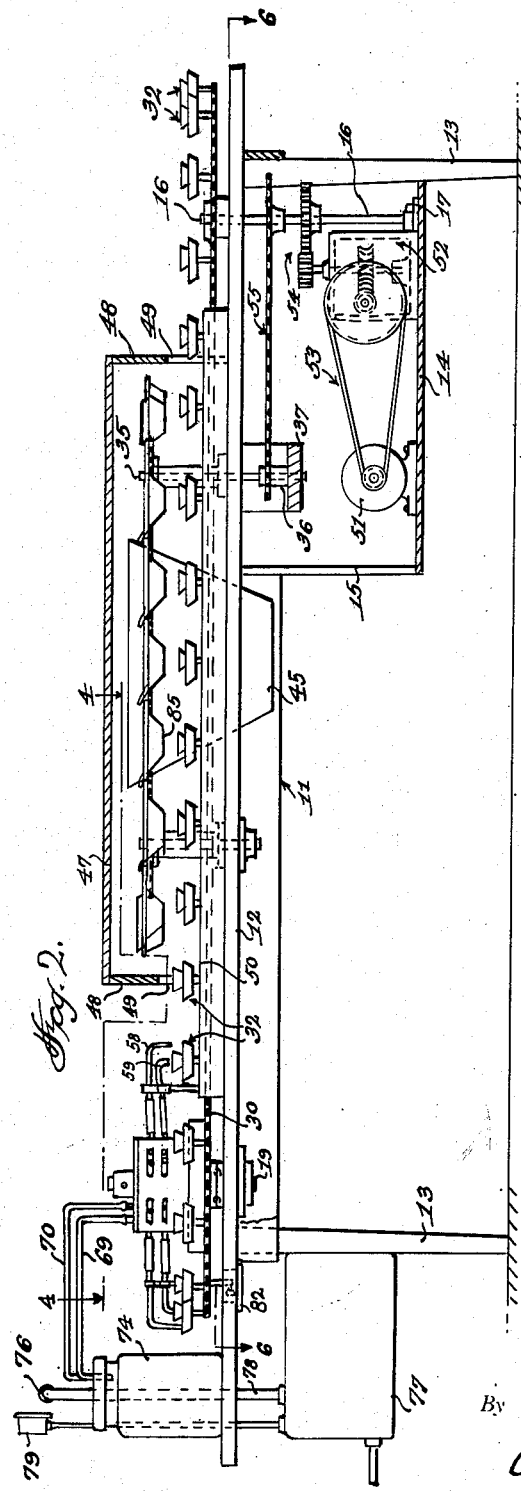
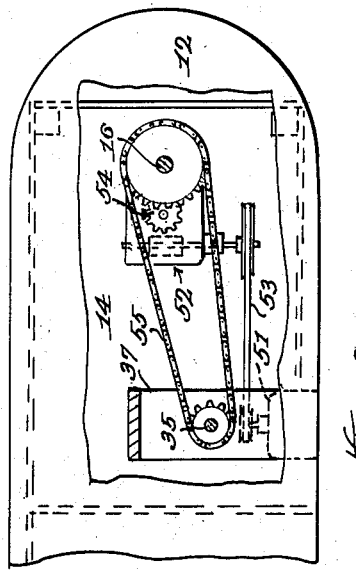
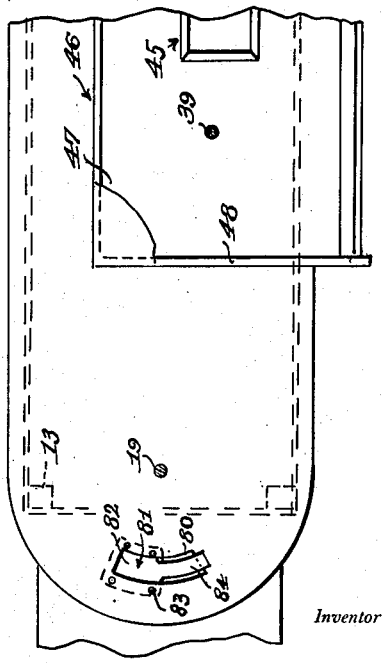
Inventor
DAVIS FRIEBERG
By John N. Randolph
Attorney

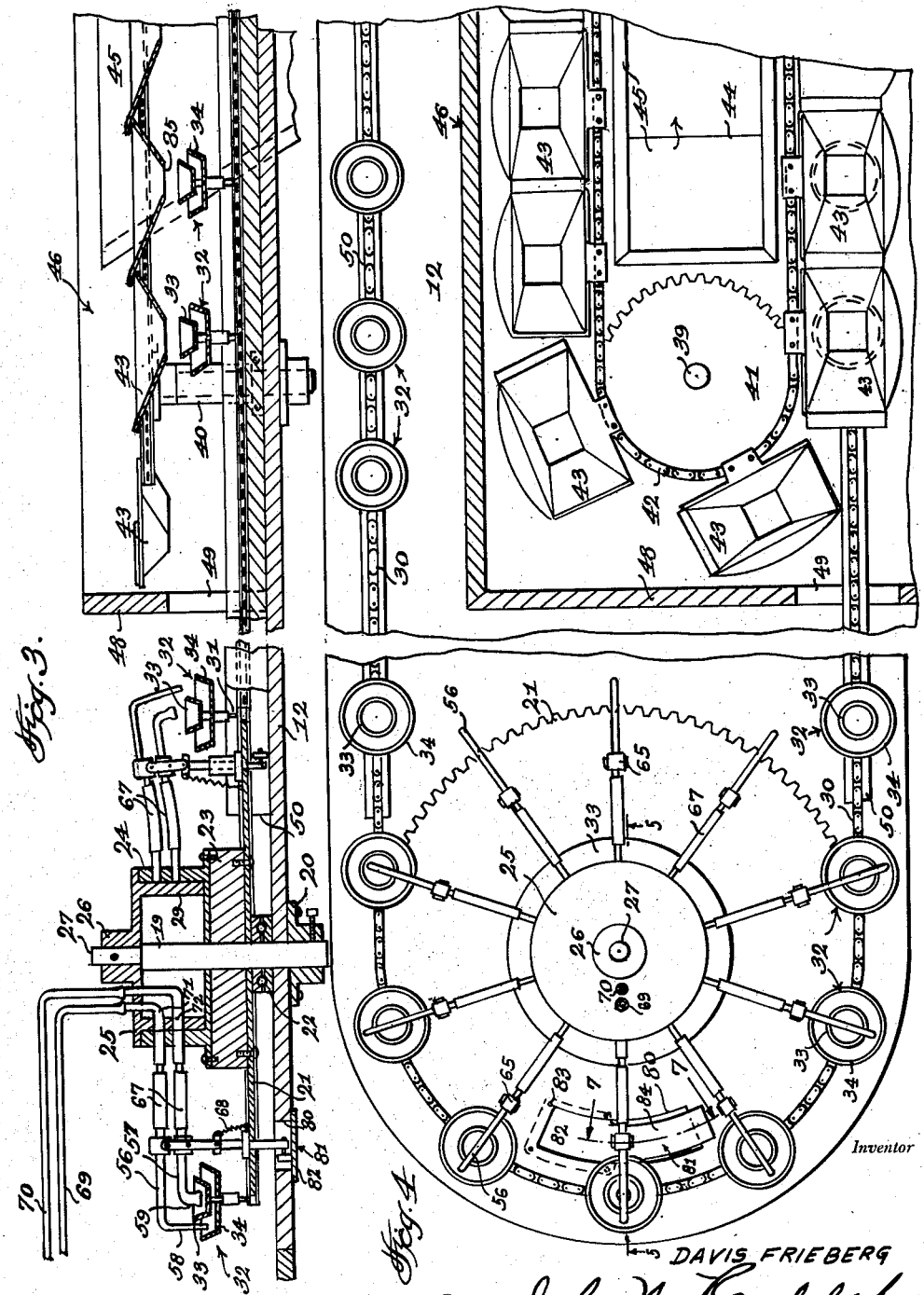

Patented Mar. 24, 1953

2,632,490

UNITED STATES PATENT OFFICE 2,632,490

EGG SEPARATOR

Davis Frieberg, Milwaukee, Wis.

Application September 12, 1951, Serial No. 246,213

9 Claims. (Cl. 146—2)

This invention relates to a novel apparatus by means of which egg yolks and egg whites are separated and conveyed to separate storage containers and wherein the separating operation is accomplished automatically after manual breaking of the eggs.

More particularly, it is an aim of the invention to provide an apparatus including a driven endless conveyor supporting a plurality of multiple receptacles into which the eggs are deposited and automatically separated and from which the separated egg yolks and egg whites are extracted by suction and deposited in separate storage containers.

Another object of the invention is to provide an apparatus including a separate driven endless conveyor the movements of which synchronize to the movement of the multiple receptacle supporting endless conveyor and on which is supported a plurality of funnel members each of which travels a distance in a position above one of the multiple receptacles whereby the broken eggs may be dropped into the funnel and directed thereby into the multiple receptacles for separation therein to eliminate any risk of spilling the egg whites and egg yolks and to insure a correct separation thereof.

Still a further object of the invention is to provide a novel suction means including revolving intake nozzles the movements of which are synchronized to the movement of the multiple receptacles and which nozzles are displaceable downwardly into the multiple receptacles for extracting separately the egg yolks and egg whites therefrom during a portion of the travel of each revolution of the nozzles.

Various other objects and advantages of the invention will hereinafter become more fully apparent from the following description of the drawings, illustrating a presently preferred embodiment thereof, and wherein:

Figure 1 is a top plan view of the egg separating apparatus;

Figure 2 is a side elevational view, partly in vertical section thereof;

Figure 3 is an enlarged fragmentary longitudinal sectional view taken substantially along a plane as indicated by the line 3—3 of Figure 1;

Figure 4 is a fragmentary horizontal sectional view, partly in top plan, taken substantially along a plane as indicated by the line 4—4 of Figure 2 and on an enlarged scale;

Figure 5 is an enlarged fragmentary vertical sectional view taken substantially along a plane as indicated by the line 5—5 of Figure 4;

Figure 6 is a fragmentary horizontal sectional view taken substantially along a plane as indicated by the line 6—6 of Figure 2, and Figure 7 is an enlarged detail sectional view taken substantially along a plane as indicated by the line 7—7 of Figure 4.

Referring more specifically to the drawings, the novel egg separating apparatus in its entirety is designated generally 10 and includes an elongated supporting table 11 having an elongated table top 12 and a plurality of supporting legs 13 which depend therefrom near the ends of the table top 12. The table 11 also includes a sub-platform 14 which is located below the table top 12 and near one end of the table 11 and which is supported at one end by the legs 13, which are disposed at one end of the table 11, and at its opposite end by a hanger 15 which is secured to and depends from the table top 12.

A shaft 16 has a lower end which is journalled in a thrust bearing 17 which is mounted on the platform 14. The shaft 16 extends upwardly through and is journalled in a portion of the table top 12 near one end thereof. A large sprocket wheel 18 is fixed to the upper end of the shaft 16 and disposed above the table top 12. A stationary shaft 19 extends upwardly through the table top 12 near its opposite end and has its lower end rigidly secured to the table top by a setscrew and collar fastening means 20, as illustrated in Figure 3. A large sprocket wheel 21 is journalled on the shaft 19 and is supported by an antifriction bearing 22 for free rotation above the table top 12, said bearing 22 resting on the table top and being disposed around the shaft 19. A disk or block 23 is disposed centrally on and secured to the sprocket wheel 21 for rotation therewith around the shaft 19 and has an annular upstanding flange 24 fixed thereto and which is disposed concentrically around the shaft 19. A disk 25 is disposed on the upper end of the flange 24 and has a centrally disposed boss 26 receiving the upper restricted end 27 of the shaft 19 and which is secured thereto by a pin 28 so that the disk 25 is held stationary with the shaft 19. The disk 25 has a depending annular flange 29 which fits relatively snug within the flange 24. It will be readily apparent that the flange 24 and disk 23 turn with the sprocket wheel 21 relatively to the disk 25 and flange 29 which are held stationary with the shaft 19.

An endless sprocket chain 30 is trained around the sprocket wheels 18 and 21. A plurality of rods 31 forming standards are secured to spaced links of the chain 30 and project upwardly therefrom and are spaced equal distances apart throughout the circumference of the chain. Each of the upright rods or standards 31 supports a multiple egg separating receptacle, designated generally 32, including an upper yolk receiving cup 33 and a lower, larger egg white receiving saucer 34 which is disposed beneath the cup 33 and in the upper portion of which the lower part of the cup is disposed.

A shaft 35 extends upwardly through the table top 12 between the sprockets 18 and 21 and adjacent the sprocket 18 and is journalled and supported at its lower end by a thrust bearing 36. The thrust bearing 36 is mounted on a support 37 which is suitably supported above the platform 14 and beneath the table top 12. A sprocket wheel 38 is fixed to the upper end of the shaft 35. A shaft 39 extends upwardly through the table top 12 between the sprocket wheels 18 and 21 and nearer the sprocket wheel 21 and is journalled and supported relatively to said table top by antifriction bearing means 40 which directly support a sprocket wheel 41 secured to the upper end of the shaft 39 and which thrust bearing means is supported by the table top 12. The sprocket wheels 38 and 41 are substantially smaller than the sprocket wheels 18 and 21 and are located above the level of said last mentioned sprocket wheels between the flights of the chain 30 and nearer one flight thereof than the other flight, as best illustrated in Figure 1. An endless sprocket chain 42 is trained around the sprocket wheels 38 and 41. A plurality of funnels 43 are secured to spaced links of the chain 42 and extend outwardly therefrom. The funnels 43 are spaced apart a distance corresponding to the spacing of the multiple receptacles 32. Each of the funnels 43 is generally of rectangular shape and is elongated in a direction longitudinally of the chain 42. As best seen in Figure 1, the table top 12 is provided with an elongated flange opening 44 constituting a disposal opening the upstanding surrounding elongated flange 45 of which is disposed between the flights of the chain 42 and between the sprocket wheels 38 and 41.

A box-like frame 46 is fixed to and rises from the table top 12 and is disposed around the funnels 43. The open top of the frame 46 may be closed by a removable cover 47, a portion of which is shown in Figure 6 when the apparatus 10 is not in use. The end walls 48 of the frame 46 are provided with aligned openings 49 through which one flight of the endless conveyor 30 extends together with the multiple receptacles supported thereby and which flight is movable through the frame 46 and beneath the funnels 43 carried by the adjacent flight of the chain 42. A pair of guide channels 50 are supported on and extend longitudinally of the table 12 for supporting and guiding the flights of the chain 30 between the sprocket wheels 18 and 21, one of said channels extending longitudinally through the frame 46 and through its openings 49.

A power source such as a small electric motor 51 is secured on the platform 14 for driving the shaft 16. The shaft 16 is driven at a reduced speed by means of a speed reducing unit 52 which is driven through a belt and pulley drive 53 by the motor 51 and which is connected to the shaft 16 by a gearing 54. Likewise, the shaft 16 is connected to the shaft 35 by a sprocket wheel and chain drive 55, the sprocket wheels of which are of proper relative size to drive the smaller sprocket wheel 38 faster than the sprocket wheel 18 so that the chain 42 will travel at the same speed as the chain 30 in order that one funnel 43 will be disposed over each multiple receptacle 32 as it travels through the housing 46 and while the funnels are traveling in a straight line above the receptacles 32.

A plurality of pairs of suction tubes are supported by and project radially from the flange 24, each of which pairs includes an upper tube 56 and a lower tube 57. The tubes 56 and 57 are provided at their outer ends with downturned intake nozzles 58 and 59, respectively. As best seen in Figure 5, the sprocket wheel 21 is provided with a series of circumferentially spaced internally threaded bosses 60 in each of which is mounted a guide sleeve 61 which extends upwardly therefrom. A supporting rod 62 extends slidably through each guide sleeve 61 and downwardly through the sprocket wheel 21 and is provided at its lower end with a roller 63 journalled on a pin 64. A pair of vertically spaced collars 65 engage the tubes 56 and 57 of each pair of tubes and are supported by links 66 which are connected thereto and which are supported by and extend upwardly from the upper end of the rod 62 for supporting the outer end portions of the suction conduits 56 and 57, the inner ends of which are supported by the flange 24. Each of the conduits 56 and 57 is provided with a flexible portion 67 between its collar 65 and the flange 24. A pull spring 68, which is connected to the upper end of each rod 62 and anchored to the sprocket wheel 21 urges the rods 62 downwardly to normally maintain the rollers 63 thereof in contact with the upper surface of the table top 12.

A pair of suction conduits 69 and 70 have complementary ends extending downwardly through the disk 25 and which have outturned terminals 71 and 72, respectively, which are anchored in vertically spaced openings 73 of the flange 29 and which terminate flush with the outer surface thereof so that during each revolution of the flange 24 around the flange 29 the end of each suction tube 56 which is secured in the flange 24 moves into full registration with the conduit terminal 71 and the complementary end of each suction 57 moves into registration with the conduit terminal 72. The opposite end of the conduit 69 extends downwardly into a container 74 and the opposite end of the conduit 70 extends downwardly into a container 75. A pipe 76 has downturned ends one of which opens into the container 74 and the other of which opens into the container 75, said conduits 69 and 70 and pipe 76 terminating adjacent the tops of the containers 74 and 75. The containers 74 and 75 are sealed except for their connections with the conduits and pipe. A suitable vacuum unit 77 is supported as by means of certain of the legs 13 beneath the containers 74 and 75 and is connected by a conduit 78 to the intermediate portion of the pipe 76 for creating a suction in said pipe and accordingly in the containers 74 and 75, the conduits 69 and 70 and the suction tubes 56 and 57, when the latter are in registration or communication with the conduit terminals 71 and 72, respectively. The suction unit 77 may likewise be provided with a gauge 79 disposed above the table top 12 for indicating the vacuum or suction in the conduit 78 and so that by suitable regulating means, not shown, a proper or desired vacuum may be maintained at all times in the suction conduits 69 and 70.

A portion of the table top 12 disposed beneath a part of the sprocket wheel 21 and adjacent the containers 74 and 75 is provided with an elongated arcuate opening 80. An elongated arcuate plate 81 has one end portion 82 closing the bottom of one end of the opening 80 and which is secured by fastenings 83 to the underside of the table top 12. The opposite end of the plate 81 is reduced in width as seen at 84 and has its terminal resting upon the upper surface of the table top 12 beyond the opposite end of the opening 80 and is inclined upwardly with respect to the plate portion 82, as best seen in Figure 7 to form a ramp surface 84.

Assuming that the motor 51 is operating to drive the shafts 16 and 35 for driving the sprocket wheels 18 and 38, respectively, which in turn drive the sprocket wheels 21 and 41, respectively, by means of the endless chains 30 and 42, respectively, said sprocket wheels and chains are caused to revolve in a counterclockwise direction as viewed from above or as seen in Figure 1. The operator of the egg separating apparatus 10 stands near the outer side of the frame 46 and as each funnel member 43 which is traveling above a multiple receptacle 32 moves in front of the operator he breaks an egg and drops the contents of the shell into the funnel 43. The contents of the egg, comprising the egg yolk and egg white, will flow through the opening 85 in the bottom of the funnel 43 into the cup 33 which is disposed directly therebeneath. The egg yolk, not shown, will fill the cup 43 and the egg white will flow over the rim of the cup and down into the saucer 34 disposed therebeneath to thus automatically separate the egg yolk and egg white. While this is occurring, the operator drops the empty shell into the surrounding flange 45 by which it is directed through the opening 44 into any suitable receptacle, not shown, which is disposed therebeneath. The operator repeats this operation with respect to each funnel 43 and multiple receptacle 32 passing from left to right in front of him, as seen in Figure 1. After the multiple receptacles have thus been filled with the separated egg yolks and egg whites they pass out from beneath the funnel members 43 beneath which they were travelling and continue counterclockwise around the sprocket wheel 18 and from right to left as seen in Figure 1 toward the sprocket wheel 21. The funnel members 43 travel in the same direction around the sprocket wheel 38 and then around the sprocket wheel 41 each back into position over another multiple receptacle 32, so that each funnel member 43 travels a plurality of times over a multiple receptacle 32 during each complete circuit of travel of the multiple receptacles 32 and chain 30. The nozzles 58 and 59 of each pair of tubes 56 and 57 are spaced a distance from adjacent nozzles 58 and 59 corresponding to the spaces between the multiple receptacles 32 and as said nozzles move in unison with the sprocket wheel 21, it will be obvious that the nozzles travel at the same speed as the multiple receptacles and are positioned so that as the chain portion carrying each multiple receptacle 32 moves into engagement with the teeth of the sprocket wheel 21 a pair of the nozzles 58 and 59 will assume positions over said multiple receptacle, as clearly illustrated in Figures 1, 3, 4 and 5. The intake tubes 56 and 57 will then travel in a circular path in unison with the multiple receptacle 32 over which they are disposed and the nozzles 58 and 59 will be supported in elevated positions above the level of the multiple receptacle by the roller 63 engaging on the upper surface of the table top 12. However, as the roller moves into engagement with the opening 80 it will drop suddenly downwardly onto the plate portion 82 allowing the rod supporting the tubes 56 and 57 to move downwardly and so that said tubes will likewise swing downwardly on their flexible portions 67 to cause the nozzle 59 to assume a position in the cup 33 and the nozzle 58 to be positioned in the saucer 34, as illustrated in Figure 3. While thus disposed, the suction tubes 56 and 57 will move into registration with the conduit terminals 71 and 72, respectively, and immediately upon establishment of this communication a suction will be produced in the nozzles 58 and 59 for extracting the egg white from the saucer 34 and the yolk from the cup 33 through the nozzles 58 and 59 and conduits 56 and 57. Communication will be maintained for a sufficient time to permit the egg white and yolk to be drawn at least into the conduits 69 and 70 before communication is broken off by movement of the tubes 56 and 57 out of registration with the terminals 71 and 72. Thereafter, the roller will engage the ramp surface 84 and travel upwardly thereon back onto the upper surface of the table top 12 and in so moving will displace the rod which it supports upwardly to elevate the nozzles 58 and 59 above the multiple receptacle 32 so that said receptacle can move away from said nozzles as the portion of the chain 30 by which it is supported moves out of engagement with the teeth of the sprocket wheel 21 and carries the multiple receptacle into a position again beneath a funnel 43 to be refilled, as previously described. It will be readily apparent that this operation is repeated in connection with each of the multiple receptacles 32 during each movement of the chain 30 through a complete circuit.

Various modifications and changes are contemplated, and may obviously be resorted to, without departing from the spirit or scope of the invention as hereinafter defined by the appended claims.

I claim as my invention:

1. An egg separating apparatus comprising a driven endless conveyor, a plurality of multiple receptacles connected to said endless conveyor and supported thereabove in equally spaced relationship to one another each including a small upper receptacle adapted to be filled with an egg yolk and a larger lower receptacle adapted to receive the egg white overflowing the rim of the smaller receptacle disposed thereabove, a plurality of pairs of suction tubes, rotary supporting means for the suction tubes connected to and driven by the endless conveyor whereby the tubes travel at a speed corresponding to the speed of movement of the multiple receptacles and synchronized therewith so that a pair of the tubes will travel in unison with each multiple receptacle during a part of its travel in a complete circuit of movement on the endless conveyor, said suction tubes having downturned nozzles disposed one above each of the two receptacles of the multiple receptacle, a cam track and roller means for each pair of suction tubes for supporting the nozzles thereof above the multiple receptacle during a part of the travel of said tubes with the multiple receptacle and within the receptacles during another part of the travel of the tubes and multiple receptacle, and stationary suction conduits having intake ends disposed whereby said suction tubes move into registration therewith while the nozzles are disposed in said receptacles for extracting the egg yolk and egg white from the receptacles by suction through the tubes into said conduits while the tubes and conduits are in registration.

2. An egg separating apparatus as in claim 1, and separate receptacles into which said conduits discharge the separated egg yolks and egg whites.

3. An egg separating apparatus as in claim 1, and a second driven endless conveyor travelling at the same speed as said first mentioned conveyor, a plurality of funnels secured to and projecting outwardly from said second endless conveyor spaced from one another a distance corresponding to the spacing between said multiple receptacles, each of said multiple receptacles travelling beneath one of the funnels during a part of each circuit of its travel whereby the contents of an egg deposited into said funnel will be discharged therefrom into the smaller upper receptacle disposed therebeneath to effect separation of the egg yolk and egg white by the egg white overflowing the rim of the upper receptacle and spilling therefrom into the larger lower receptacle disposed therebeneath.

4. An egg separating apparatus as in claim 3, and a guide channel in which said first mentioned endless conveyor is supported and guided during the travel of the multiple receptacle beneath the funnel.

5. An egg separating apparatus as in claim 3, each of said endless conveyors including a sprocket chain, a pair of sprocket wheels over which each of the sprocket chains is trained, one of the sprocket wheels of each sprocket chain constituting a driven sprocket, the sprocket wheels of the second conveyor being smaller than the sprocket wheels of the first mentioned conveyor and disposed therebetween, and means for driving the drive sprockets of the two conveyors including synchronizing means for driving the endless chains in unison.

6. An egg separating apparatus comprising a driven endless conveyor, a plurality of multiple receptacles connected to and supported by the endless conveyor in equally spaced relationship to one another and each including an upper egg yolk receiving receptacle adapted to be filled with an egg yolk and a lower egg white receiving receptacle disposed beneath and around the egg yolk receiving receptacle and adapted to contain an egg white spilling over the rim of the egg yolk receiving receptacle, a pair of storage containers for receiving the separated egg yolks and egg whites, means for creating a suction in said containers, a pair of suction conduits having discharge ends one discharging into each of said containers, said conduits having opposite stationary inlet ends, a plurality of pairs of suction tubes each including a downwardly opening intake nozzle, means supporting said suction tubes and driven by said endless conveyor whereby each pair of suction tubes will travel in unison with one of the multiple receptacles during a portion of each circuit of its travel, said suction tubes having outlet ends supported by the tube supporting means for movement in registry with the inlet ends of said suction conduits during a portion of the travel of the suction tubes in unison with one of the multiple receptacles, cam and roller means for supporting the suction tube nozzles of each pair of suction tubes with the inlet ends of said nozzles disposed one within each of the receptacles while the suction tubes are in registration with the suction conduits and for supporting the nozzles above said receptacles while the tubes and conduits are not in registration.

7. An apparatus as in claim 6, said multiple receptacles being supported by the endless conveyor for movement in a horizontal plane.

8. An egg separating apparatus as in claim 6, a second driven endless conveyor, a plurality of funnels secured to and carried by said second endless conveyor travelling at the same speed as said multiple receptacles, each of said multiple receptacles during a portion of its circuit of movement travelling beneath one of the funnels whereby the contents of an egg deposited therein will be directed by the funnel into the upper egg yolk receiving receptacle.

9. An egg separating apparatus comprising a driven endless conveyor, a plurality of multiple receptacles supported by said endless conveyor in spaced relationship to one another each including an upper egg yolk receiving cup and a lower larger egg white receiving saucer disposed beneath and around the cup and adapted to be filled with the egg white spilling over the rim of the cup when filled by an egg yolk, and suction extracting means for separately extracting the contents of the cup and saucer of each multiple receptacle during a portion of its travel in each circuit of its movement including a pair of suction nozzles movable in unison with each multiple receptacle during a portion of its travel and a cam surface and roller for supporting said nozzles one within the cup and the other within the saucer during a part of the travel of the nozzles in unison with the multiple receptacle and above and out of engagement with the cup and saucer during the remainder of the travel of the nozzles in unison with the multiple receptacle.

DAVIS FRIEBERG.

REFERENCES CITED

The following references are of record in the file of this patent:

UNITED STATES PATENTS

| Number | Name | Date |
| --- | --- | --- |
| 1,507,221 | Weiss | Sept. 2, 1924 |
| 1,747,432 | Eskholme | Feb. 18, 1930 |
| 1,795,118 | Hall | Mar. 3, 1931 |
| 2,090,963 | Reese | Aug. 24, 1937 |